(12) United States Patent
Ito et al.

(10) Patent No.: US 8,855,185 B2
(45) Date of Patent: Oct. 7, 2014

(54) EQUALIZATION DEVICE, RECEPTION DEVICE AND EQUALIZATION METHOD

(75) Inventors: Naosuke Ito, Tokyo (JP); Jun Ido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/111,979

(22) PCT Filed: Nov. 18, 2011

(86) PCT No.: PCT/JP2011/076661
§ 371 (c)(1),
(2), (4) Date: Oct. 15, 2013

(87) PCT Pub. No.: WO2013/008347
PCT Pub. Date: Jan. 17, 2013

(65) Prior Publication Data
US 2014/0036983 A1    Feb. 6, 2014

(30) Foreign Application Priority Data

Jul. 11, 2011 (JP) ................. 2011-152598

(51) Int. Cl.
*H03H 7/30* (2006.01)
*H04B 1/10* (2006.01)
*H04L 27/01* (2006.01)
*H04L 25/03* (2006.01)
*H04L 25/02* (2006.01)

(52) U.S. Cl.
CPC .......... *H04L 27/01* (2013.01); *H04L 25/03159* (2013.01); *H04L 25/0212* (2013.01)
USPC .......................................... 375/232; 375/350

(58) Field of Classification Search
CPC ............... H04L 2025/03414; H04L 25/03159; H04L 2025/03522; H04L 25/0212; H04L 25/022; H04L 2027/0042; H04L 27/01; H04L 2027/0038; H04L 27/264; H04L 27/2675; H03H 21/0012; H04B 1/001
USPC .......................................... 375/232–236, 350
See application file for complete search history.

(56) References Cited

U.S. PATENT DOCUMENTS 5,886,748 A    3/1999 Lee
6,275,554 B1    8/2001 Bouillet et al.
(Continued)

FOREIGN PATENT DOCUMENTS

| JP | 3-278723 A | 12/1991 |
|----|----|----|
| JP | 9-214982 A | 8/1997 |
| JP | 2001-60898 A | 3/2001 |
| JP | 2009-100358 A | 5/2009 |
| JP | 2010-98471 A | 4/2010 |
| WO | WO 2006/077729 A1 | 7/2006 |
| WO | WO 2007/010678 A1 | 1/2007 |

*Primary Examiner* — Don N Vo
(74) *Attorney, Agent, or Firm* — Birch, Stewart, Kolasch & Birch, LLP

(57) ABSTRACT

This equalization device and method, while preventing an expansion of circuit size, enable high-speed detection of a CIR in order to effectively achieve frequency domain equalization even when the phase of the received signal is significantly different from the phase of the known signal, and when the transmission channel has large temporal variations. A reference signal extraction unit (112) extracts both a real part component and an imaginary part component from the portion of the received signal including the known signal. A CIR detection filter unit (120) filters the known signal to generate a first processed signal and a second processed signal, detects real part filter coefficients by updating a first filter coefficient used in filtering the known signal in such a way that the first processed signal converges to the real part component, and detects imaginary part filter coefficients by filtering the known signal in such a way that the second processed signal converges to the imaginary part component. A CIR output unit (140) uses either the real part filter coefficients or the imaginary part filter coefficients to identify the channel impulse response.

17 Claims, 6 Drawing Sheets

(56) References Cited

U.S. PATENT DOCUMENTS

| | | |
|---|---|---|
| 7,180,552 B2 | 2/2007 | Kim |
| 7,406,120 B1 * | 7/2008 | Schmidt et al. ............... 375/229 |
| 8,279,953 B2 | 10/2012 | Uesugi et al. |
| 2002/0168001 A1 * | 11/2002 | Ramsey ........................ 375/232 |
| 2006/0269016 A1 * | 11/2006 | Long et al. .................... 375/340 |
| 2009/0103670 A1 | 4/2009 | Minamino |
| 2009/0285335 A1 | 11/2009 | Hoshuyama |
| 2010/0232493 A1 * | 9/2010 | Thirumoorthy ............... 375/232 |

* cited by examiner

TAP NUMBER

TAP NUMBER

EQUALIZATION DEVICE, RECEPTION DEVICE AND EQUALIZATION METHOD

TECHNICAL FIELD

The present invention relates to an equalization device for equalizing a received signal, a reception device incorporating the equalization device, and an equalization method for equalizing a received signal.

BACKGROUND ART

When a multilevel VSB (Vestigial SideBand) modulated signal is demodulated, it is necessary to correct (hereinafter, 'equalize') the phase and amplitude of the received signal to compensate for channel distortion and fading. Particularly when the channel distortion is large or the channel characteristics change greatly over time, techniques for improving equalization accuracy and for assured tracking of rapid channel changes are needed.

In the general category of equalization there are time domain equalization and frequency domain equalization. Time domain equalization is an equalization method that feeds the received signal into an adaptive filter and corrects distortion in the received signal while optimizing the filter coefficients by use of an adaptive algorithm. Frequency domain equalization is an equalization method that detects the time domain CIR (Channel Impulse Response) on the basis of the received signal, executes a Fourier transform on the detected response, and equalizes the waveform in the frequency domain. In the ATSC (Advanced Television Systems Committee) broadcast standard, which uses VSB modulation and has been adopted in North America, for example, a field synchronization signal is inserted in the standard data frame as a known PN code signal; a known method of frequency domain equalization uses this signal as a reference signal in performing CIR detection (see, for example, Patent Reference 1).

PRIOR ART REFERENCES

Patent References

Patent reference 1: U.S. Pat. No. 7,180,552

SUMMARY OF THE INVENTION

Problems to be Solved by the Invention

One known CIR detection method is an LS (Least Squares) algorithm that obtains a correlation vector between the known signal and the received signal, inverts the autocorrelation matrix of the received signal, and calculates the CIR from the product of the correlation vector and the inverted matrix. Although this method is optimal in the sense of minimizing the error between the received signal and the result of processing of the known signal, it is computationally intensive because it includes a matrix inversion computation. The RLS (Recursive Least Squares) algorithm, which is based on the LS algorithm, avoids the need for inverse matrix computations, but remains computational intensive and requires much circuitry.

To reduce the amount of computation associated with CIR detection, other known CIR detection methods feed the known signal into a filter, find filter coefficients such that the filter output matches the received signal, and identify this filter with the transmission channel. In these methods, the filter coefficients are obtained by a sequential correction algorithm that corrects the coefficients repeatedly. The LMS (Least Mean Square) algorithm, for example, is one known sequential correction algorithm.

The following equation (1) is an exemplary coefficient update equation used in the LMS algorithm.

$$C_m(n+1) = C_m(n) - \mu X_m(n) E(n): \quad (1)$$

In equation (1), $C_m(n)$ is the mth tap coefficient at the nth coefficient update. $X_m(n)$ is the mth tap input at the nth coefficient update. The symbol $\mu$ is a correction coefficient that determines the amount of correction performed per update. $E(n)$ is an error signal with respect to the received signal at the nth coefficient update, obtained by subtracting the received signal from the filter output. In the LMS algorithm, the received signal $X_m$ and error signal $E$ are used to perform sequential corrections of the coefficients.

A sequential correction algorithm such as the LMS algorithm requires less computation and less circuitry than the LS and RLS algorithms, so sequential correction algorithms are advantageous in regard to implementation. Many samples are needed in order for the filter coefficients to converge, however, so enhancement of convergence speed is a general problem. A particular problem is that when the phase of the received signal differs greatly from the phase of the known signal, and when the transmission channel has large temporal variations, the filter coefficients take too long to converge, failing to converge within the desired time period, so demodulation performance is markedly degraded.

A technique described in Patent Reference 1 therefore reduces the effects of fading with large temporal variations by performing frequency domain equalization and then also performing time domain equalization. As two types of equalization devices are needed, however, the large size of the circuitry remains a problem.

The present invention therefore addresses these problems with the objects of, while maintaining a small circuit size, carrying out high-speed CIR detection and efficient frequency domain equalization even when the phase of the received signal is significantly different from the phase of the known signal and when the transmission channel has large temporal variations.

Means for Solving the Problem

An equalization device according to one aspect of the present invention includes a first Fourier transform unit for generating a frequency domain signal by performing a Fourier transform on a received signal including a known signal, a reference signal extraction unit for extracting, from the received signal, a real part component and an imaginary part component of a part including the known signal, a detection filter unit for executing a filtering process on the known signal to generate a first processed signal, updating first filter coefficients, when executing the filtering process on the known signal, to make the first processed signal converge to the real part component, selecting real part filter coefficients from the updated first filter coefficients, executing a filtering process on the known signal to generate a second processed signal, updating second filter coefficients, when executing the filtering process on the known signal, to make the second processed signal converge to the imaginary part component, and selecting imaginary part filter coefficients from the updated second filter coefficients, and an output unit for using either the real part filter coefficients or the imaginary part filter coefficients to identify a channel impulse response, a second Fourier transform unit for generating a channel estimation signal by performing a Fourier transform on the channel impulse response, an equalization unit for generating an equalized signal by correcting the frequency domain signal on a basis of the channel estimation signal, and an inverse Fourier transform unit for generating a demodulated signal by executing an inverse Fourier transform on the equalized signal.

Effects of the Invention

According to one aspect of the invention, high-speed CIR detection and efficient frequency domain equalization are possible while maintaining a small circuit size, even when the phase of the received signal differs significantly from the phase of the known signal and when the transmission channel has large temporal variations.

MODES FOR CARRYING OUT THE INVENTION

First Embodiment

Figure 1:
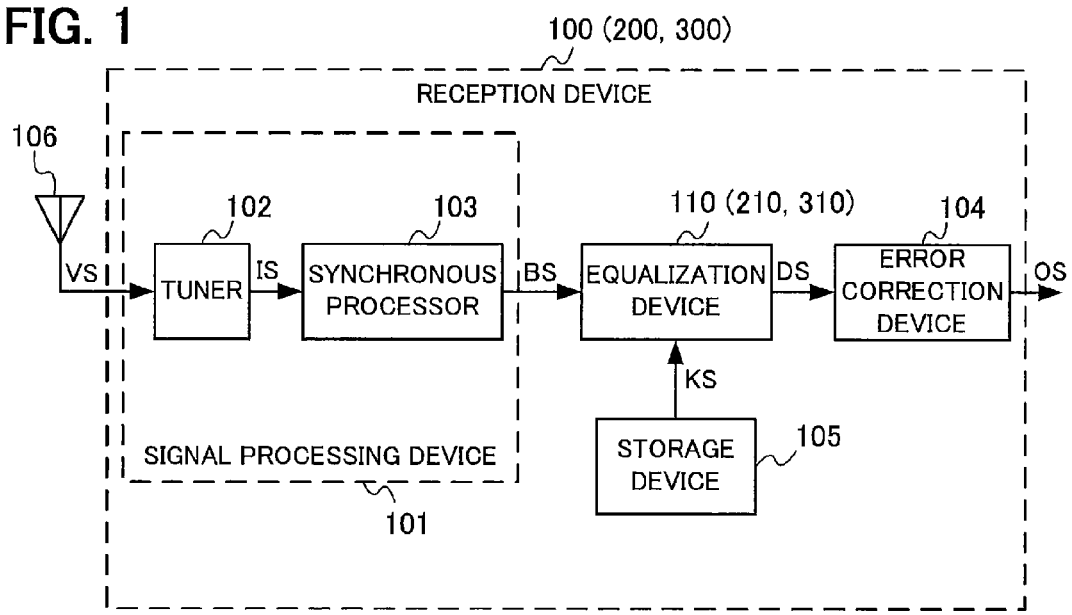
FIG. 1 is a block diagram schematically showing the structure of a reception device according to a first embodiment.

FIG. 1 is a block diagram schematically showing the structure of a reception device 100 according to the first embodiment. The reception device 100 includes a signal processing device 101, an equalization device 110, an error correction device 104, and a storage device 105. Elements in the second or third embodiment are indicated by reference characters in parentheses in FIG. 1.

The signal processing device 101 generates the received signal by converting a broadcast signal (a VSB signal in the first embodiment) received by an antenna 106 to a predetermined frequency band. The signal processing device 101 includes a tuner 102 and a synchronous processor 103.

The tuner 102 converts the frequency of the VSB signal VS received by the antenna 106, generates an IF (Intermediate Frequency) signal IS, and supplies the IF signal IS to the synchronous processor 103.

The synchronous processor 103 generates a baseband signal BS by performing synchronous detection on the IF signal IS, and supplies the baseband signal BS to the equalization device 110.

The equalization device 110 generates a demodulated signal DS by equalizing the baseband signal BS, and supplies the demodulated signal DS to the error correction device 104.

The error correction device 104 generates an output signal OS by performing an error correction process on the demodulated signal DS, and outputs the output signal OS.

The storage device 105 stores information required for processing in the reception device 100. For example, in the first embodiment, the storage device 105 stores a known signal KS.

Figure 2:
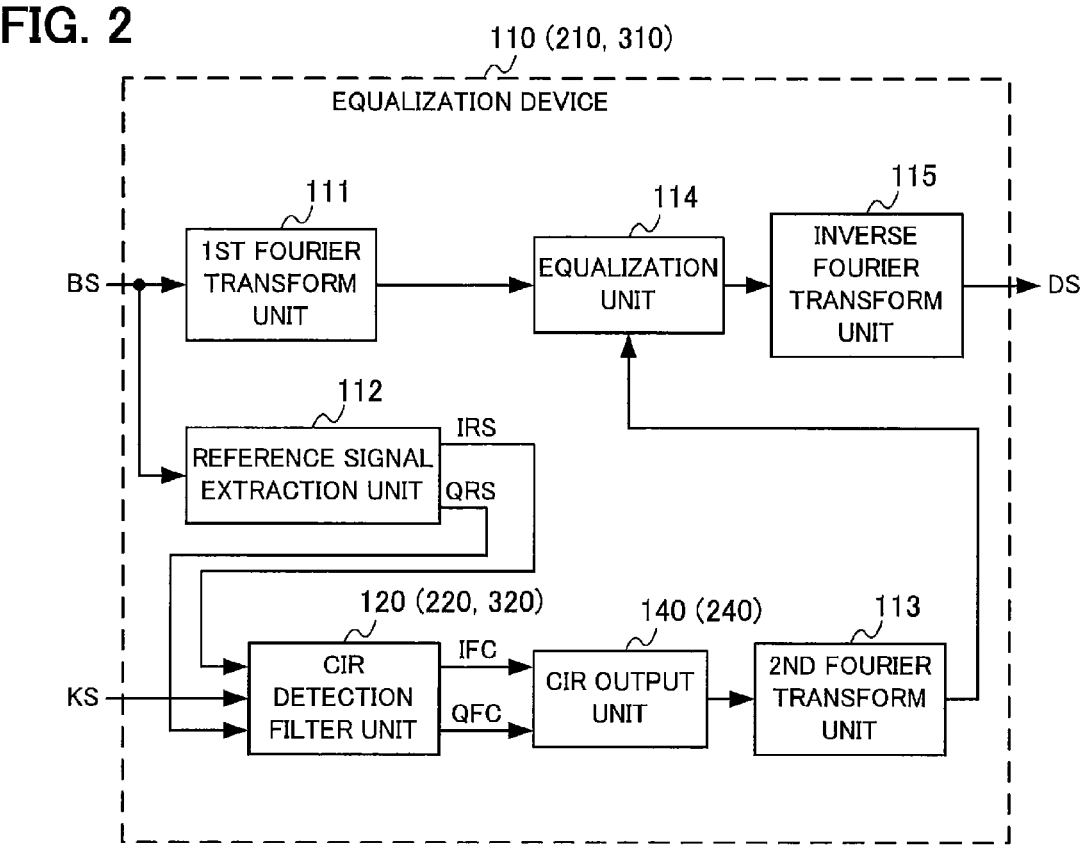
FIG. 2 is a block diagram schematically showing the structure of an equalization device in the first embodiment.

FIG. 2 is a block diagram schematically showing the structure of the equalization device 110. The equalization device 110 includes a first Fourier transform unit 111, a reference signal extraction unit 112, a CIR detection filter unit 120, a CIR output unit 140, a second Fourier transform unit 113, an equalization unit 114, and an inverse Fourier transform unit 115. Elements in the second or third embodiment are indicated by reference characters in parentheses in FIG. 2.

The first Fourier transform unit 111 receives the baseband signal BS, which is the received signal generated by converting the multilevel VSB modulated signal to the predetermined frequency band, as its input, and generates a frequency domain signal by performing a Fourier transform on a predetermined segment of the baseband signal BS. The first Fourier transform unit 111 supplies the frequency domain signal to the equalization unit 114.

The reference signal extraction unit 112 extracts an I component (a real part component) and a Q component (an imaginary part component) from a segment of the baseband signal BS on which the known signal is superimposed. The reference signal extraction unit 112 supplies the CIR detection filter unit 120 with the extracted I component signal as a real part reference signal IRS, and the extracted Q component signal as an imaginary part reference signal QRS. In the terrestrial digital broadcasting system in the U.S.A, for example, a pseudorandom signal is embedded in the transmitted data sequence at regular intervals as a known signal. The reference signal extraction unit 112 therefore detects the timing of the segments in which the known signal is embedded, and extracts the real part reference signal IRS and the imaginary part reference signal QRS.

The CIR detection filter unit 120 receives the known signal KS, the real part reference signal IRS, and the imaginary part reference signal QRS as inputs, executes separate filtering processes using real-valued filter coefficients on the known signal KS according to each of the real part reference signal IRS and the imaginary part reference signal QRS, and identifies respective filter coefficients corresponding to the real part reference signal IRS and the imaginary part reference signal QRS. The real part filter coefficients IFC are filter coefficients identified on the basis of the real part reference signal IRS; the imaginary part filter coefficients QFC are filter coefficients identified on the basis of the imaginary part reference signal QRS. A filtering process using real-valued filter coefficients will be referred to below as a real filtering process to distinguish it from a complex filtering process. The CIR detection filter unit 120 supplies the CIR output unit 140 with the real part filter coefficients IFC and imaginary part filter coefficients QFC. The known signal KS is obtained from the storage device 105 shown in FIG. 1.

Figure 3:
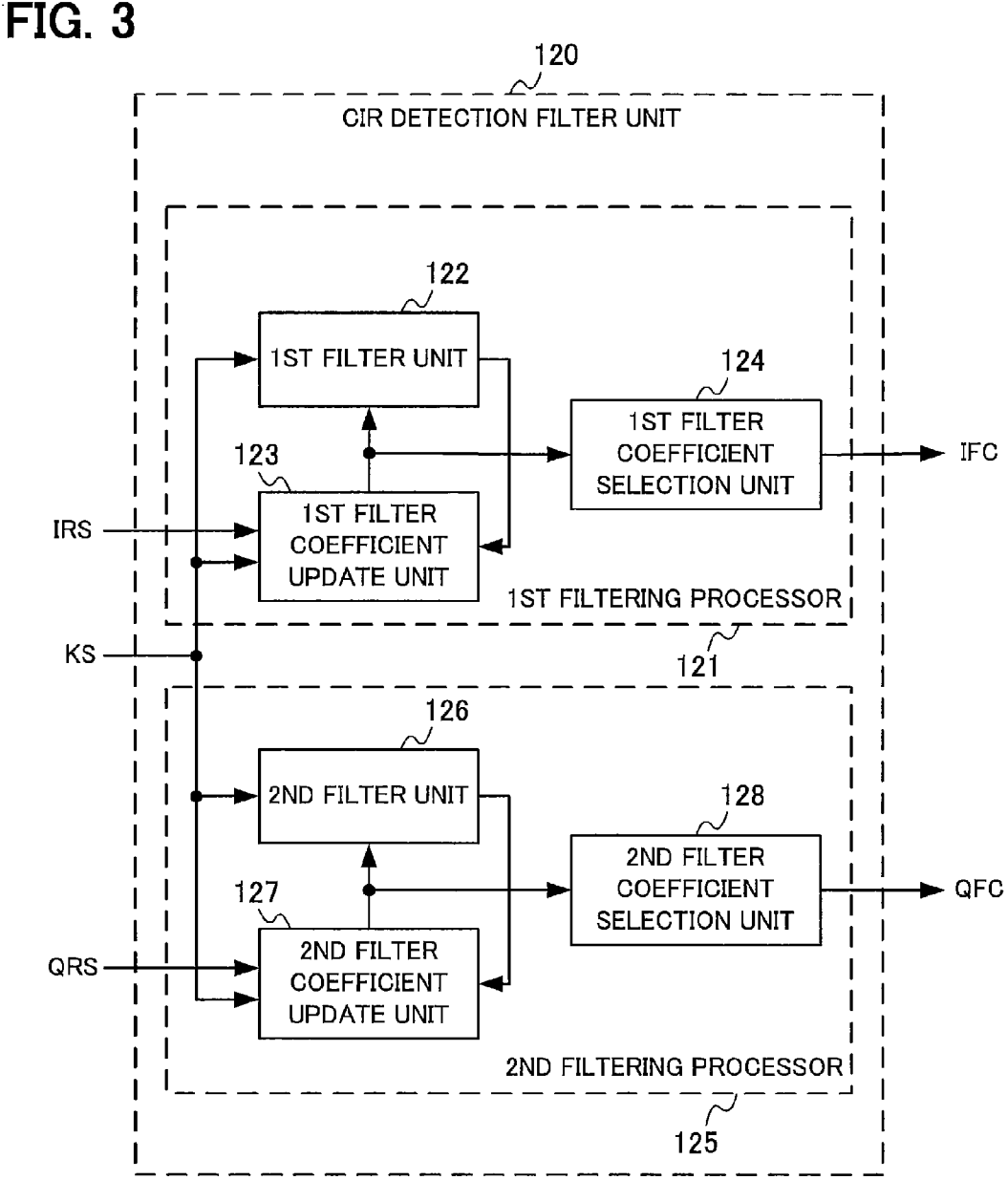
FIG. 3 is a block diagram schematically showing the structure of a CIR detection filter unit in the first embodiment.

FIG. 3 is a block diagram schematically showing the structure of the CIR detection filter unit 120. The CIR detection filter unit 120 includes a first filtering processor 121 and a second filtering processor 125.

The first filtering processor 121 selects the real part filter coefficients IFC from first filter coefficients detected by executing the filtering process on the known signal KS in such a way as to converge to the real part reference signal IRS, and outputs the real part filter coefficients IFC. The first filtering processor 121 includes a first filter unit 122, a first filter coefficient update unit 123, and a first filter coefficient selection unit 124.

The first filter unit 122 executes a real filtering process on the known signal KS, and supplies the processing result to the first filter coefficient update unit 123 as a first processed signal. The real filtering process is, for example, a process that adds estimated transmission filtering and estimated waveform distortion in the transmission channel to the known signal KS, and outputs an estimated received signal. A filter such as an FIR (Finite Impulse Response) filter is used in the real filtering process. The filter coefficients (first filter coefficients) of the filter used by the first filter unit 122 are supplied from the first filter coefficient update unit 123.

The first filter coefficient update unit 123 uses the known signal KS, the real part reference signal IRS, and the first processed signal output from the first filter unit 122, and updates the first filter coefficients in such a way that the first processed signal approaches and then matches the real part reference signal IRS. The first filter coefficient update unit 123 supplies the updated first filter coefficients to the first filter unit 122 and the first filter coefficient selection unit 124. When the real part reference signal IRS matches the first processed signal, the first filter unit 122 corresponds to the transmission channel through which the received signal has passed, and the first filter coefficients output from the first filter coefficient update unit 123 indicate the channel impulse response.

The first filter coefficient selection unit 124 selects the first filter coefficients output from the first filter coefficient update unit 123 after a predetermined time has elapsed since the inception of updating of the first filter coefficients following the arrival of the known signal, or after the first filter coefficients have been updated a predetermined number of times, and supplies the selected first filter coefficients to the CIR output unit 140 as the real part filter coefficients IFC. The predetermined time and predetermined number of times are a time and number of times such that the CIR can be detected with the desired accuracy.

The second filtering processor 125 selects the imaginary part filter coefficients QFC from second filter coefficients detected by executing the filtering process on the known signal KS in such a way as to converge to the imaginary part reference signal QRS, and outputs the imaginary part filter coefficients QFC. The second filtering processor 125 includes a second filter unit 126, a second filter coefficient update unit 127, and a second filter coefficient selection unit 128.

The second filter unit 126 executes a real filtering process on the known signal KS, and supplies the processing result to the second filter coefficient update unit 127 as a second processed signal. A filter such as, for example, an FIR filter is used in the real filtering process. The filter coefficients (second filter coefficients) of the filter used by the second filter unit 126 are supplied from the second filter coefficient update unit 127.

Using the known signal KS, the imaginary part reference signal QRS, and the second processed signal output from the second filter unit 126, the second filter coefficient update unit 127 updates the second filter coefficients in such a way that the second processed signal approaches and then matches the imaginary part reference signal QRS. The second filter coefficient update unit 127 supplies the updated second filter coefficients to the second filter unit 126 and the second filter coefficient selection unit 128. When the imaginary part reference signal QRS matches the second processed signal, the second filter unit 126 corresponds to the transmission channel through which the received signal has passed, and the products of the second filter coefficients output from the second filter coefficient update unit 127 multiplied by an imaginary number indicate the channel impulse response. When the output from the second filter unit 126 is compared with the imaginary part reference signal QRS, it is assumed that the phase of the reference signal extracted from the received signal is rotated 90°, so the reason for multiplying the second filter coefficients by an imaginary number is to correct the assumed phase rotation.

The second filter coefficient selection unit 128 selects the second filter coefficients output from the second filter coefficient update unit 127 after a predetermined time has elapsed since the inception of updating of the second filter coefficients following the arrival of the known signal, or after the second filter coefficients have been updated a predetermined number of times, and supplies the selected second filter coefficients to the CIR output unit 140 as the imaginary part filter coefficients QFC.

Sequential update algorithms such as the LMS (Least Mean Square Error) algorithm and CMA (Constant Modulus Algorithm) are generally used for updating filter coefficients. Such algorithms are prior art, and because any conventional algorithm and means may be used to obtain the first filter coefficients output from the first filter coefficient update unit 123 and the second filter coefficients output from the second filter coefficient update unit 127 in the first embodiment, a detailed description will be omitted.

Returning to FIG. 2, the CIR output unit 140 receives the real part filter coefficients IFC and the imaginary filter coefficients QFC as its inputs, and detects the CIR. The CIR output unit 140 supplies the detected CIR to the second Fourier transform unit 113.

Figure 4:
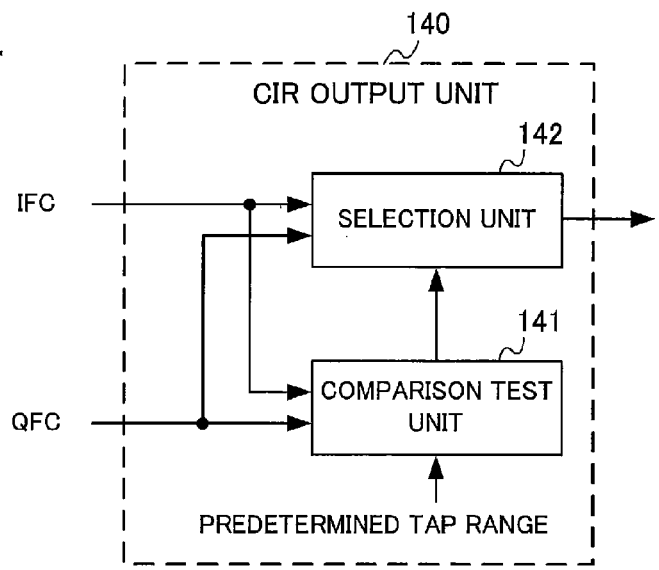
FIG. 4 is a block diagram schematically showing the structure of a CIR output unit in the first embodiment.

FIG. 4 is a block diagram schematically showing the structure of the CIR output unit 140. The CIR output unit 140 includes a comparison test unit 141 and a selection unit 142.

The comparison test unit 141 receives the real part filter coefficients IFC and the imaginary filter coefficients QFC as its inputs, calculates an absolute value of a total sum of the real part filter coefficients IFC in a predetermined tap range as a first test value, and calculates an absolute value of a total sum of the imaginary part filter coefficients QFC in the predetermined tap range as a second test value. The comparison test unit 141 tests the magnitudes of the first test value and the second test value, and supplies the test result to the selection unit 142. The tap range is predetermined so as to include the peak values in the real part filter coefficients IFC and imaginary filter coefficients QFC. For example, because the tap number corresponding to the peak value in the real part filter coefficients IFC and imaginary filter coefficients QFC is substantially determined by the transmission channel, the predetermined tap range may be centered on the tap number corresponding to the peak value. The tap range may also be changed dynamically according to the state of the transmission channel, in other words, according to the pattern of the input filter coefficients. When there are a plurality of peak values because of the effects of other signals such as reflected signals, for example, the comparison test unit 141 may calculate a total sum in a tap range shorter than the predetermined tap range, in order to calculate the total sum of the filter coefficients in a tap range corresponding to a single peak value, excluding other peak values. When there is a single peak value, the comparison test unit 141 may calculate a total sum in a tap range longer than the predetermined tap range in order to reduce noise effects.

The selection unit 142 selects either the real part filter coefficients IFC or the imaginary filter coefficients QFC according to the output from the comparison test unit 141, and identifies the CIR from the selected filter coefficients. The selection unit 142 supplies the identified CIR to the second Fourier transform unit 113 shown in FIG. 2.

When the test signal output from the comparison test unit 141 indicates that the first test value is greater than the second test value, for example, the selection unit 142 generates a complex signal having the filter coefficients output from the first filter coefficient selection unit 124 as its real part and values of zero as its imaginary part. When the test signal output from the comparison test unit 141 indicates that the second test value is greater than the first test value, the selection unit 142 generates a complex signal having the filter coefficients output from the second filter coefficient selection unit 128 as its imaginary part and values of zero as its real part. The selection unit 142 identifies the generated complex signal as the CIR. When the first and second test values are equal, the selection unit 142 may generate either a complex signal having the filter coefficients output from the first filter coefficient selection unit 124 as its real part and values of zero as its imaginary part or a complex signal having the filter coefficients output from the second filter coefficient selection unit 128 as its imaginary part and values of zero as its real part. The selection unit 142 therefore generates the CIR on the basis of the filter coefficients calculated from whichever of the real part reference signal and the imaginary part reference signal includes more information corresponding to the known signal (the signal better reflecting the information corresponding to the known signal).

Figure 5:
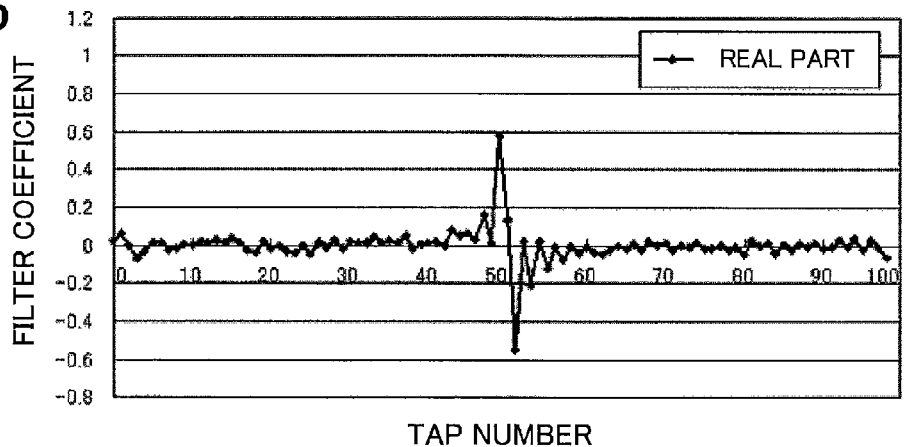
FIG. 5 is a schematic diagram showing exemplary real part filter coefficients in the first embodiment.
Figure 6:
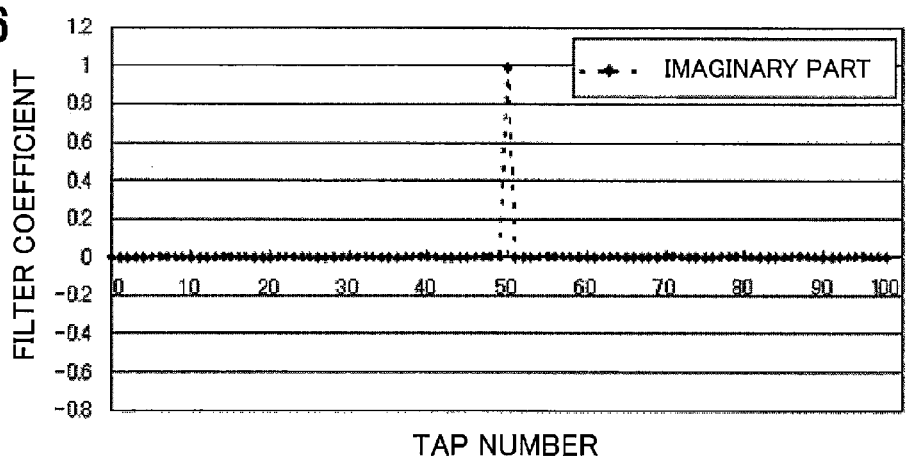
FIG. 6 is a schematic diagram showing exemplary imaginary part filter coefficients in the first embodiment.

The comparison of magnitudes of the first test value and the second test value will now be described. The phase of the known signal superimposed on the signal that has passed through the transmission channel is rotated. A case in which the received signal is a VSB modulated signal with a phase rotated 90° by the transmission channel will be described as an example. FIG. 5 is a schematic diagram showing exemplary real part filter coefficients IFC at a given point in time in such a case. FIG. 6 is a schematic diagram showing exemplary imaginary part filter coefficients QFC at the given point in time in such a case. In the filter coefficients corresponding to the ideal CIR, all real part taps have values of zero, a single imaginary part tap has a value of one, and the other imaginary part taps have values of zero. When the phase of the received signal differs greatly from the phase of the known signal, as in a case in which the phase of the received signal has been rotated by as much as 90°, however, it would generally take a long time for the filter coefficients to converge to the ideal filter coefficients. When the transmission channel has large temporal variations, it would take a similarly long time for the filter coefficients to converge to the ideal filter coefficients. In the example shown in FIGS. 5 and 6, the real part filter coefficients IFC would be slow to converge.

Because, due to the characteristics of VSB modulation, the real part filter coefficients IFC shown in FIG. 5 have odd symmetry centered on a given tap, the total sum of the real part filter coefficients IFC approaches zero. Because the imaginary part filter coefficients QFC shown in FIG. 6 have a peak at a given tap, the total sum of the imaginary part filter coefficients QFC has a non-zero value. Due to the characteristics described above, in VSB modulation, by comparing the absolute values of the total sums of the real part filter coefficients IFC and the imaginary part filter coefficients QFC, even when there is as large a phase rotation as 90°, either the real part filter coefficients or the imaginary part filter coefficients can be used to generate the CIR, and whichever of the real part filter coefficients IFC and the imaginary part filter coefficients QFC converge more quickly can be selected.

Even if the phase rotation is other than 90°, whichever of the real part filter coefficients IFC and the imaginary part filter coefficients QFC better reflects the information corresponding to the known signal and converges more quickly can be selected by comparing the first test value and the second test value.

In normal VSB modulation, information corresponding linearly to the known signal is held in the I component, and the known signal is distributed according to a regular rule in the Q component by the transmission filter used for VSB modulation. When the phase is rotated by 90° in the IQ plane, the axis (component) where the information is held changes, so the information corresponding linearly to the known signal is extracted from the Q component. Therefore, real part filter coefficients IFC like the ones shown in FIG. 5 are obtained as the result of the filtering process using the real part component and imaginary part filter coefficients QFC like the ones shown in FIG. 6 are obtained as the result of the filtering process using the imaginary part component.

High-speed CIR detection can be carried out with a small amount of circuitry or a small amount of computation by using values in a predetermined tap range for the comparison test on the real part filter coefficients IFC and the imaginary part filter coefficients QFC.

Use of values of zero as the imaginary part or real part in CIR detection can suppress superimposed noise effects in the CIR detection.

Returning to the description of FIG. 2, to perform frequency domain equalization in the equalization unit 114, the second Fourier transform unit 113 generates a channel estimation signal by performing a Fourier transform on the CIR supplied from the CIR output unit 140. The second Fourier transform unit 113 then supplies the channel estimation signal to the equalization unit 114.

The equalization unit 114 generates an equalized signal by performing frequency domain equalization on the frequency domain signal received from the first Fourier transform unit 111 on the basis of the channel estimation signal received from the second Fourier transform unit 113. The equalization unit 114 supplies the equalized signal to the inverse Fourier transform unit 115.

By executing an inverse Fourier transform on the equalized signal received from the equalization unit 114 to convert it to a time domain signal, the inverse Fourier transform unit 115 generates a demodulated signal in which received signal distortion arising in the transmission channel has been corrected. The inverse Fourier transform unit 115 outputs the demodulated signal.

As described above, frequency domain equalization can be speeded up by using the known signal superimposed on the received signal to conduct a comparison test on two sets of filter coefficients before using them in CIR detection. Use of values in a predetermined tap range for the comparison test on the two sets of filter coefficients makes for comparatively simple computation and enables high-speed CIR detection. Use of values of zero as the imaginary part or real part in CIR detection can suppress noise effects.

Second Embodiment

In the first embodiment, the first filter coefficient selection unit 124 and second filter coefficient selection unit 128 shown in FIG. 3 output the real part filter coefficients IFC and imaginary part filter coefficients QFC after a predetermined time has elapsed following the start of filter updating after the arrival of the known signal, or after the second filter coefficients have been updated a predetermined number of times. In the second embodiment, a contrasting example will be shown in which the real part filter coefficients IFC and imaginary part filter coefficients QFC are output at the timing at which the processed signal following the real filtering process converges to the known signal. In the first embodiment, the comparison test unit 141 shown in FIG. 4 uses the values of the filter coefficients in a predetermined tap range for the comparison test. In the second embodiment, a contrasting example will be shown in which the tap range used for the comparison test is set according to the peak position of the absolute value of the filter coefficients.

As shown in FIG. 1, a reception device 200 according to the second embodiment includes a signal processing device 101, an equalization device 210, an error correction device 104, and a storage device 105. The reception device 200 in the second embodiment differs from the reception device 100 in the first embodiment in regard to the equalization device 210.

As shown in FIG. 2, the equalization device 210 in the second embodiment includes a first Fourier transform unit 111, a reference signal extraction unit 112, a CIR detection filter unit 220, a CIR output unit 240, a second Fourier transform unit 113, an equalization unit 114, and an inverse Fourier transform unit 115. The equalization device 210 in the second embodiment differs from the equalization device 110 in the first embodiment in regard to the CIR detection filter unit 220 and CIR output unit 240.

Figure 7:
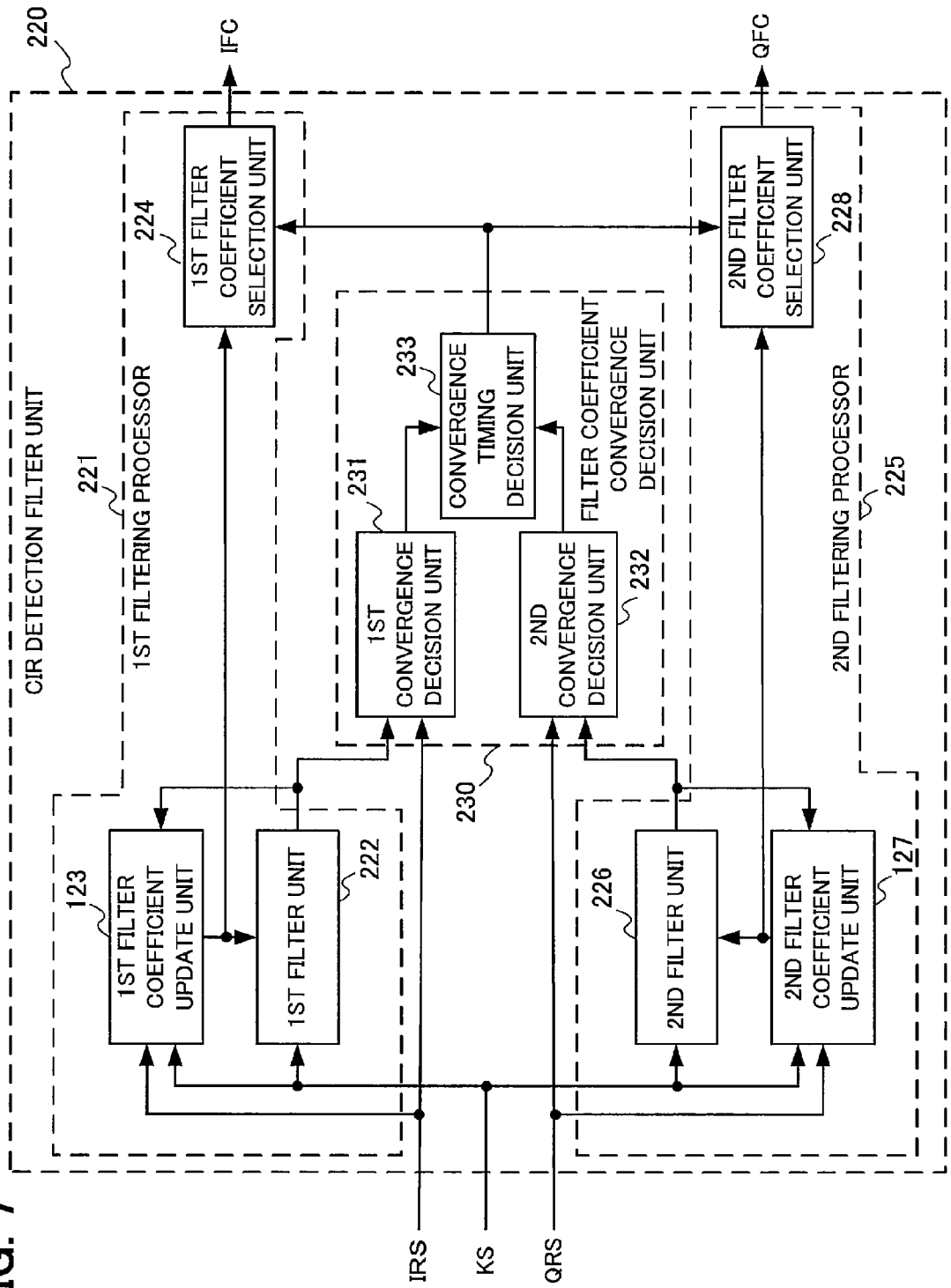
FIG. 7 is a block diagram schematically showing the structure of the CIR detection filter unit in a second embodiment.

FIG. 7 is a block diagram schematically showing the structure of the CIR detection filter unit 220. The CIR detection filter unit 220 includes a first filtering processor 221, a second filtering processor 225, and a filter coefficient convergence decision unit 230. The first filtering processor 221 includes a first filter unit 222, a first filter coefficient update unit 123, and a first filter coefficient selection unit 224. The first filtering processor 221 in the second embodiment differs from the first filtering processor 121 in the first embodiment in regard to the first filter unit 222 and the first filter coefficient selection unit 224. The second filtering processor 225 includes a second filter unit 226, a second filter coefficient update unit 127, and a second filter coefficient selection unit 228. The second filtering processor 225 in the second embodiment differs from the second filtering processor 125 in the first embodiment in regard to the second filter unit 226 and the second filter coefficient selection unit 228.

The first filter unit 222 performs the same process as in the first embodiment and also supplies a first convergence decision unit 231 with the first processed signal generated by executing the real filtering process on the known signal KS.

Each time a convergence decision result is received from the convergence timing decision unit 233, the first filter coefficient selection unit 224 selects the first filter coefficients output from the first filter coefficient update unit 123 following the convergence decision, and supplies the CIR output unit 240 with the selected first filter coefficients as the real part filter coefficients IFC.

The second filter unit 226 performs the same process as in the first embodiment and also supplies a second convergence decision unit 232 with the second processed signal generated by executing the real filtering process on the known signal KS.

Each time a convergence decision result is received from the convergence timing decision unit 233, the second filter coefficient selection unit 228 selects second filter coefficients output from the second filter coefficient update unit 127 following the convergence decision, and supplies the CIR output unit 240 with the selected second filter coefficients as the imaginary part filter coefficients QFC.

The filter coefficient convergence decision unit 230 receives the real part reference signal IRS, the imaginary part reference signal QRS, the first processed signal output from the first filter unit 222, and the second processed signal output from the second filter unit 226 as inputs, decides whether the first filter coefficients have converged in the first filter unit 222 and whether the second filter coefficients have converged in the second filter unit 226, and outputs the result of these convergence decisions. The filter coefficient convergence decision unit 230 includes the first convergence decision unit 231, the second convergence decision unit 232, and the convergence timing decision unit 233.

The first convergence decision unit 231 receives the first processed signal output from the first filter unit 222 and the real part reference signal IRS as inputs, decides whether the first processed signal output from the first filter unit 222 has converged to the real part reference signal IRS, and outputs a first decision result indicating convergence to the convergence timing decision unit 233 when the first processed signal has converged.

The second convergence decision unit 232 receives the second processed signal output from the second filter unit 226 and the imaginary part reference signal QRS as inputs, decides whether the second processed signal output from the second filter unit 226 has converged to the imaginary part reference signal QRS, and outputs a second decision result indicating convergence to the convergence timing decision unit 233 when the second processed signal has converged.

The first convergence decision unit 231 and the second convergence decision unit 232 may decide that the first and second processed signals have converged when the mean square value of the differences between their respective inputs is equal to or less than a predetermined threshold value. Alternatively, the first convergence decision unit 231 and the second convergence decision unit 232 may decide that the first and second processed signals have converged when total sum of the absolute values of the differences between their respective inputs is equal to or less than a predetermined threshold value. Moreover, the first convergence decision unit 231 and the second convergence decision unit 232 may decide that the first and second processed signals have converged when a weighted mean square value of the differences between their respective inputs is equal to or less than a predetermined threshold value.

The convergence timing decision unit 233 receives the first decision result output from the first convergence decision unit 231 and the second decision result output from the second convergence decision unit 232 as inputs, decides whether either the first filter coefficients in the first filter unit 222 or the second filter coefficients in the second filter unit 226, or both, have converged, and supplies a convergence decision result indicating convergence to the first filter coefficient selection unit 224 and the second filter coefficient selection unit 228. Because the CIR is detected after convergence decisions are made on the filter coefficients updated in the two filtering processes as described above, the speed and accuracy of CIR detection can be enhanced.

Figure 8:
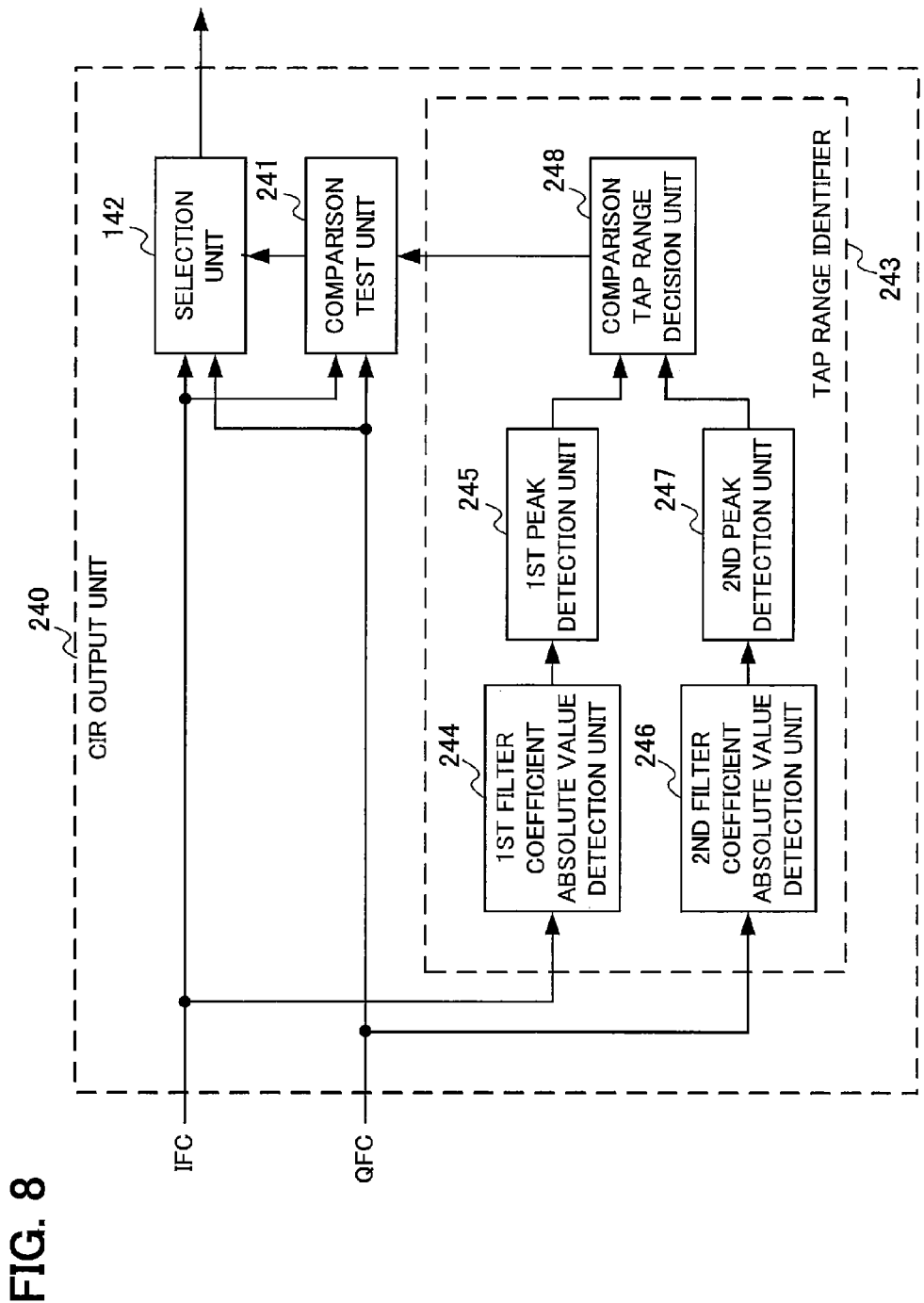
FIG. 8 is a block diagram schematically showing the structure of the CIR output unit in the second embodiment.

Next, the CIR output unit 240 in the second embodiment will be described with reference to FIG. 8. FIG. 8 is a block diagram schematically showing the structure of the CIR output unit 240. The CIR output unit 240 includes a comparison test unit 241, a selection unit 142, and a tap range identifier 243. The CIR output unit 240 in the second embodiment differs from the CIR output unit 140 in the first embodiment in regard to the processing in the comparison test unit 241 and by including the tap range identifier 243.

The tap range identifier 243 selects one position, either the tap position of the peak value in the real part filter coefficients IFC or the tap position of the peak value in the imaginary part filter coefficients QFC, and identifies a range including a predetermined number of taps preceding and following the selected position as the tap range. The tap range identifier 243 includes a first filter coefficient absolute value detection unit 244, a first peak detection unit 245, a second filter coefficient absolute value detection unit 246, a second peak detection unit 247, and a comparison tap range decision unit 248.

The first filter coefficient absolute value detection unit 244 receives the real part filter coefficients IFC as its input, calculates the absolute values of the received real part filter coefficients IFC, and supplies the calculated absolute values to the first peak detection unit 245.

The first peak detection unit 245 receives the absolute values output from the first filter coefficient absolute value detection unit 244 as its input, detects the peak value in the real part filter coefficients IFC and the tap position corresponding to the peak value, and supplies the comparison tap range decision unit 248 with real part peak information indicating the peak value and the tap position corresponding to the peak value. The first peak detection unit 245 can identify the tap position corresponding to the peak value by, for example, receiving the absolute values in ascending order of tap number.

The second filter coefficient absolute value detection unit 246 receives the imaginary part filter coefficients QFC as its input, calculates the absolute values of the received imaginary part filter coefficients QFC, and supplies the calculated absolute values to the second peak detection unit 247.

The second peak detection unit 247 receives the absolute values output from the second filter coefficient absolute value detection unit 246 as its input, detects the peak value of the imaginary part filter coefficients QFC and the tap position corresponding to the peak value, and supplies the comparison tap range decision unit 248 with imaginary part peak information indicating the peak value and the tap position corresponding to the peak value. The second peak detection unit 247 can identify the tap position corresponding to the peak value by, for example, receiving the absolute values in ascending order of tap number.

From the real part peak information output from the first peak detection unit 245 and the imaginary part peak information output from the second peak detection unit 247, the comparison tap range decision unit 248 selects a tap position by comparing the peak values indicated by both information, and identifies a range including a predetermined number of taps preceding and following the selected tap position as the tap range. The comparison tap range decision unit 248 supplies information indicating the identified tap range to the comparison test unit 241.

By using the tap range indicated by the information output from the comparison tap range decision unit 248, the comparison test unit 241 calculates a first test value and a second test value, tests the magnitudes of the first test value and the second test value, and supplies the test result to the selection unit 142 as in the first embodiment.

The CIR detection filter unit 220 in the second embodiment may be replaced with the CIR detection filter unit 120 in the first embodiment. The CIR output unit 240 in the second embodiment may be replaced with the CIR output unit 140 in the first embodiment.

Since the CIR is detected after convergence decisions are made on the filter coefficients updated in the two filtering processes in the second embodiment as described above, the speed and accuracy of CIR detection can be enhanced. Use of peak values of the filter coefficients for the comparison test on the filter coefficients permits CIR detection even in a transmission channel in which the dominant wave changes.

Third Embodiment

In the first and second embodiments, the first filtering processors 121, 221 generate the real part filter coefficients IFC, and the second filtering processors 125, 225 generate the imaginary part filter coefficients QFC. In the third embodiment, a contrasting example will be shown in which a single filtering processor generates both the real part filter coefficients IFC and the imaginary part filter coefficients QFC by executing a time-division filtering process on the real part reference signal IRS and the imaginary part reference signal QRS.

As shown in FIG. 1, the reception device 300 according to the third embodiment includes a signal processing device 101, an equalization device 310, an error correction device 104, and a storage device 105. The reception device 300 in the third embodiment differs from the reception device 100 in the first embodiment in regard to the equalization device 310.

As shown in FIG. 2, the equalization device 310 in the third embodiment includes a first Fourier transform unit 111, a reference signal extraction unit 112, a CIR detection filter unit 320, a CIR output unit 140, a second Fourier transform unit 113, an equalization unit 114, and an inverse Fourier transform unit 115. The equalization device 310 in the third embodiment differs from the equalization device 110 in the first embodiment in regard to the CIR detection filter unit 320.

Figure 9:
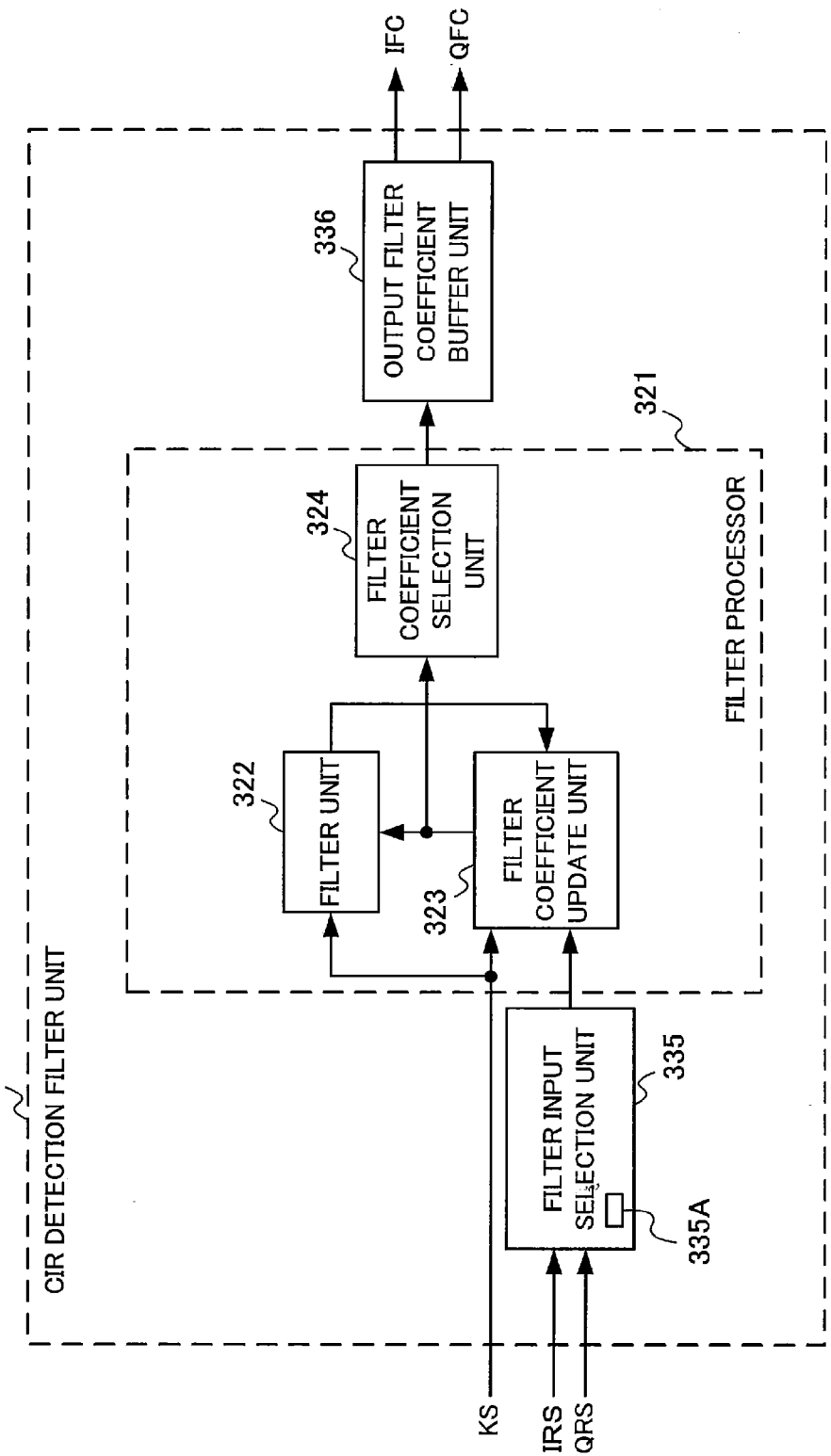
FIG. 9 is a block diagram schematically showing the structure of the CIR detection filter unit in a third embodiment.

FIG. 9 is a block diagram schematically showing the structure of the CIR detection filter unit 320. The CIR detection filter unit 320 includes a filtering processor 321, a filter input selection unit 335, and an output filter coefficient buffer unit 336. The filtering processor 321 includes a filter unit 322, a filter coefficient update unit 323, and a filter coefficient selection unit 324.

The filter input selection unit 335 receives the real part reference signal IRS and the imaginary part reference signal QRS as its inputs, stores one of the reference signals in a memory 335A, and supplies the other reference signal to the filtering processor 321. After a predetermined time, or after completion of the filtering process in the filtering processor 321, the filter input selection unit 335 supplies the reference signal stored in the memory 335A to the filtering processor 321 in place of the other reference signal. The filter input selection unit 335 outputs the real part reference signal IRS and the imaginary part reference signal QRS alternately to the filtering processor 321.

The filtering processor 321 performs the same process as the first filtering processor 121 and the second filtering processor 125 in the first embodiment.

The filter unit 322 executes a real filtering process on the known signal KS, and supplies the processing result to the filter coefficient update unit 323 as a processed signal.

The filter coefficient update unit 323 receives the known signal KS, the processed signal output from the filter unit 322, and the real part reference signal IRS or the imaginary part reference signal QRS as its inputs, and updates the first filter coefficients or the second filter coefficients in such a way that the processed signal approaches and then matches the real part reference signal IRS or the imaginary part reference signal QRS. The filter coefficient update unit 323 supplies the updated first filter coefficients or second filter coefficients to the filter unit 322 and the filter coefficient selection unit 324.

The first filter coefficient selection unit 324 selects the most recently updated first filter coefficients or second filter coefficients output from the filter coefficient update unit 323 after a predetermined time has elapsed following the start of filter updating after the arrival of the known signal, or after the first filter coefficients or the second filter coefficients have been updated a predetermined number of times, and supplies the output filter coefficient buffer unit 336 with the selected first filter coefficients as the real part filter coefficients IFC or the selected second filter coefficients as the imaginary part filter coefficients QFC.

The output filter coefficient buffer unit 336 is a storage unit that receives the real part filter coefficients IFC and the imaginary part filter coefficients QFC output from the filter coefficient selection unit 324 as its inputs, and buffers the real part filter coefficients IFC and the imaginary part filter coefficients QFC. The output filter coefficient buffer unit 336 supplies the two sets of filter coefficients to the CIR output unit 140 at a predetermined timing. Alternatively, the CIR output unit 140 may read the real part filter coefficients IFC and imaginary part filter coefficients QFC from a storage unit in which thy are stored, without use of a buffer.

The filtering processor 321 may also hold the real part filter coefficients IFC and imaginary part filter coefficients QFC from the previous CIR detection in a storage unit (not shown), and use these filter coefficients as initial values for the updating of the filter coefficients. Alternatively, the filtering processor 321 may use the real part filter coefficients IFC and imaginary part filter coefficients QFC held in the output filter coefficient buffer unit 336 from the previous CIR detection as initial values for the updating of the filter coefficients. In either case, since previous filter coefficients can then be used as initial values in the updating of the filter coefficients, the speed and accuracy of CIR detection can be enhanced.

The filtering processor 321 may also be configured to include a unit similar to the filter coefficient convergence decision unit 230 shown in the second embodiment, and the filter coefficient selection unit 324 may output the real part filter coefficients IFC or the imaginary part filter coefficients QFC at a timing at which the filter coefficients set in the filter unit 322 have converged. At the timing at which the filter coefficients set in the filter unit 322 have converged, the filter input selection unit 335 may then switch between output of the real part reference signal IRS and the imaginary part reference signal QRS. The speed and accuracy of CIR detection can be then enhanced, because the CIR is detected after convergence decisions are made.

According to the third embodiment, CIR detection can be carried out with a comparatively small amount of circuitry by executing the two filtering processes used for CIR detection by time sharing in a single filtering processor 321 as described above.

It is also possible for the equalization device 310 in the third embodiment to include the CIR output unit 240 of the second embodiment instead of the CIR output unit 140 of the first embodiment.

The embodiments above have been described on the basis of VSB modulation, but if, as in VSB modulation, for example, information corresponding linearly to a known signal is held in just one component, either the I component or the Q component, of the transmitted signal, in any modulation, efficient frequency domain equalization can be carried out by identifying the CIR from either the I component or Q component in the received signal. Information is not held in the other component, so which component better reflects the known signal can be detected by comparing the magnitudes of the real part filter coefficients corresponding to the I component in the received signal and the imaginary part filter coefficients corresponding to the Q component in the received signal.

REFERENCE CHARACTERS

100, 200, 300: reception device, 101: signal processing device, 102: tuner, 103: synchronous processor, 104: error correction device, 105: storage device, 110, 210, 310: equalization device, 111: first Fourier transform unit, 112: reference signal extraction unit, 113: second Fourier transform unit, 114: equalization unit, 115: inverse Fourier transform unit, 120, 220, 320: CIR detection filter unit, 121, 221: first filtering processor, 122, 222: first filter unit, 123: first filter coefficient update unit, 124, 224: first filter coefficient selection unit, 125: second filtering processor, 126, 226: second filter unit, 127: second filter coefficient update unit, 128, 228: second filter coefficient selection unit, 230: filter coefficient convergence decision unit, 231: first convergence decision unit, 232: second convergence decision unit, 233: convergence timing decision unit, 140, 240: CIR output unit, 141: comparison test unit, 142: selection unit, 243: tap range identifier, 244: first filter coefficient absolute value detection unit, 245: first peak detection unit, 246: second filter coefficient absolute value detection unit, 247: second peak detection unit, 248: comparison tap range decision unit, 321: filtering processor, 322: filter unit, 323: filter coefficient update unit, 324: filter coefficient selection unit, 335: filter input selection unit, 336: output filter coefficient buffer unit.

What is claimed is:

1. An equalization device comprising:
   a first Fourier transform unit for generating a frequency domain signal by performing a Fourier transform on a received signal including a known signal;
   a reference signal extraction unit for extracting, from the received signal, a real part component and an imaginary part component of a part including the known signal;
   a detection filter unit for executing a filtering process on the known signal to generate a first processed signal, updating first filter coefficients, when executing the filtering process on the known signal, to make the first processed signal converge to the real part component, selecting real part filter coefficients from the updated first filter coefficients, executing a filtering process on the known signal to generate a second processed signal, updating second filter coefficients, when executing the filtering process on the known signal, to make the second processed signal converge to the imaginary part component, and selecting imaginary part filter coefficients from the updated second filter coefficients;
   an output unit for using either the real part filter coefficients or the imaginary part filter coefficients to identify a channel impulse response;
   a second Fourier transform unit for generating a channel estimation signal by performing a Fourier transform on the channel impulse response;
   an equalization unit for generating an equalized signal by correcting the frequency domain signal on a basis of the channel estimation signal; and
   an inverse Fourier transform unit for generating a demodulated signal by executing an inverse Fourier transform on the equalized signal.

2. The equalization device of claim 1, wherein the output unit further comprises:
   a comparison test unit for calculating an absolute value of a total sum of the real part filter coefficients in a particular tap range as a first test value, calculating an absolute value of a total sum of the imaginary part filter coefficients in the particular tap range as a second test value, and comparing magnitudes of the first test value and the second test value; and a selection unit for using the real part filter coefficients to identify the channel impulse response when the first test value is greater than the second test value, and using the imaginary part filter coefficients to identify the channel impulse response when the second test value is greater than the first test value.

3. The equalization device of claim 2, wherein the selection unit identifies a complex signal having values of the real part filter coefficients as its real part and values of zero as its imaginary part when the first test value is greater than the second test value and having values of the imaginary part filter coefficients as its imaginary part and values of zero as its real part when the second test value is greater than the first test value.

4. The equalization device of claim 2, wherein:
the output unit further comprises a tap range identifier for selecting one position from among a peak value tap position in the real part filter coefficients and a peak value tap position in the imaginary part filter coefficients and identifying a range including a predetermined number of taps preceding and following the selected position as a tap range, and;
the particular tap range is the tap range identified by the tap range identifier.

5. The equalization device of claim 1, wherein the detection filter unit further comprises:
a first filter unit for setting the first filter coefficients, executing a filtering process on the known signal, and generating the first processed signal;
a first filter coefficient update unit for updating the first filter coefficients to make the first processed signal converge to the real part component and causing the first filter unit to set the updated first filter coefficients;
a first filter coefficient selection unit for selecting ones of the updated first filter coefficients as the real part filter coefficients;
a second filter unit for setting the second filter coefficients, executing a filtering process on the known signal, and generating the second processed signal;
a second filter coefficient update unit for updating the second filter coefficients to make the second processed signal converge to the imaginary part component and causing the second filtering step to set the updated second filter coefficients; and
a second filter coefficient selection unit for selecting ones of the updated second filter coefficients as the imaginary part filter coefficients.

6. The equalization device of claim 5, wherein:
the first filter coefficient selection unit selects most recently updated first filter coefficients as the real part filter coefficients after a predetermined time has elapsed from inception of updating of the first filter coefficients or after the first filter coefficients have been updated a predetermined number of times from the inception of the updating of the first filter coefficients; and
the second filter coefficient selection unit selects most recently updated second filter coefficients as the imaginary part filter coefficients after a predetermined time has elapsed from inception of updating of the second filter coefficients or after the second filter coefficients have been updated a predetermined number of times from the inception of the updating of the second filter coefficients.

7. The equalization device of claim 5, wherein the detection filter unit further comprises a filter coefficient convergence decision unit for deciding, from a difference between the first processed signal and the real part component, whether the first processed signal has converged to the real part component and deciding, from a difference between the second processed signal and the imaginary part component, whether the second processed signal has converged to the imaginary part component, and wherein:
the first filter coefficient selection unit selects most recently updated first filter coefficients as the real part filter coefficients when the filter coefficient convergence decision unit decides that at least one of the first processed signal and the second processed signal has converged; and
the second filter coefficient selection unit selects most recently updated second filter coefficients as the imaginary part filter coefficients when the filter coefficient convergence decision unit decides that at least one of the first processed signal and the second processed signal has converged.

8. The equalization device of claim 1, wherein the detection filter unit further comprises:
a filter input selection unit for receiving input of the real part component and the imaginary part component from the reference signal extraction unit and outputting the real part component and the imaginary part component alternately;
a filter unit for generating the first processed signal by setting the first filter coefficients and executing the filtering process on the known signal when the filter input selection unit outputs the real part component, and generating the second processed signal by setting the second filter coefficients and executing the filtering process on the known signal when the filter input selection unit outputs the imaginary part component; and
a filter coefficient selection unit for selecting ones of the updated first filter coefficients as the real part filter coefficients when the filter input selection unit outputs the real part component and selecting ones of the updated second filter coefficients as the imaginary part filter coefficients when the filter input selection unit outputs the imaginary part component.

9. A reception device comprising:
the equalization device of claim 1;
a storage device for storing the known signal; and
a signal processing device for generating the received signal by converting a broadcast signal to a predetermined frequency band.

10. An equalization method comprising:
a first Fourier transform step for generating a frequency domain signal by performing a Fourier transform on a received signal including a known signal;
a reference signal extraction step for extracting, from the received signal, a real part component and an imaginary part component of a part including the known signal;
a detection filtering step for executing a filtering process on the known signal to generate a first processed signal, updating first filter coefficients, when executing the filtering process on the known signal, to make the first processed signal converge to the real part component, selecting real part filter coefficients from the updated first filter coefficients, executing a filtering process on the known signal to generate a second processed signal, updating second filter coefficients, when executing the filtering process on the known signal, to make the second processed signal converge to the imaginary part component, and selecting imaginary part filter coefficients from the updated second filter coefficients;

an output step for using either the real part filter coefficients or the imaginary part filter coefficients to identify a channel impulse response;

a second Fourier transform step for generating a channel estimation signal by performing a Fourier transform on the channel impulse response;

an equalization step for generating an equalized signal by correcting the frequency domain signal on a basis of the channel estimation signal; and an inverse Fourier transform step for generating a demodulated signal by executing an inverse Fourier transform on the equalized signal.

11. The equalization method of claim 10, wherein the output step further comprises:

a comparison test step for calculating an absolute value of a total sum of the real part filter coefficients in a particular tap range as a first test value, calculating an absolute value of a total sum of the imaginary part filter coefficients in the particular tap range as a second test value, and comparing magnitudes of the first test value and the second test value; and a selection step for using the real part filter coefficients to identify the channel impulse response when the first test value is greater than the second test value, and using the imaginary part filter coefficients to identify the channel impulse response when the second test value is greater than the first test value.

12. The equalization method of claim 11, wherein the selection step identifies a complex signal having values of the real part filter coefficients as its real part and values of zero as its imaginary part when the first test value is greater than the second test value and having values of the imaginary part filter coefficient as its imaginary part and values of zero as its real part when the second test value is greater than the first test value.

13. The equalization method of claim 11, wherein:

the output step further comprises a tap range identification step for selecting one position from among a peak value tap position in the real part filter coefficients and a peak value tap position in the imaginary part filter coefficients and identifying a range including a predetermined number of taps preceding and following the selected positions as a tap range, and;

the particular tap range is the tap range identified in the tap range identification step.

14. The equalization method of claim 10, wherein the detection filtering step further comprises:

a first filtering step for setting the first filter coefficients, executing a filtering process on the known signal, and generating the first processed signal;

a first filter coefficient update step for updating the first filter coefficients to make the first processed signal converge to the real part component and causing the first filtering step to set the updated first filter coefficients;

a first filter coefficient selection step for selecting ones of the updated first filter coefficients as the real part filter coefficients;

a second filtering step for setting the second filter coefficients, executing a filtering process on the known signal, and generating the second processed signal;

a second filter coefficient update step for updating the second filter coefficients to make the second processed signal converge to the imaginary part component and causing the second filtering step to set the updated second filter coefficients; and a second filter coefficient selection step for selecting ones of the updated second filter coefficients as the imaginary part filter coefficients.

15. The equalization method of claim 14, wherein:

the first filter coefficient selection step selects most recently updated first filter coefficients as the real part filter coefficients after a predetermined time has elapsed from inception of updating of the first filter coefficients or after the first filter coefficients have been updated a predetermined number of times from the inception of the updating of the first filter coefficients; and the second filter coefficient selection step selects most recently updated second filter coefficients as the imaginary part filter coefficients after a predetermined time has elapsed from inception of updating of the second filter coefficients or after the second filter coefficients have been updated a predetermined number of times from the inception of the updating of the second filter coefficients.

16. The equalization method of claim 14, wherein the detection filtering step further comprises a filter coefficient convergence decision step for deciding, from a difference between the first processed signal and the real part component, whether the first processed signal has converged to the real part component and deciding, from a difference between the second processed signal and the imaginary part component, whether the second processed signal has converged to the imaginary part component, and wherein:

the first filter coefficient selection step selects most recently updated first filter coefficients as the real part filter coefficients when the filter coefficient convergence decision step decides that at least one of the first processed signal and the second processed signal has converged; and the second filter coefficient selection step selects most recently updated second filter coefficients as the imaginary part filter coefficients when the filter coefficient convergence decision step decides that at least one of the first processed signal and the second processed signal has converged.

17. The equalization method of claim 10, wherein the detection filtering step further comprises:

a filter input selection step for receiving input of the real part component and the imaginary part component from the reference signal extraction step and outputting the real part component and the imaginary part component alternately;

a filtering step for generating the first processed signal by setting the first filter coefficients and executing the filtering process on the known signal when the filter input selection step outputs the real part component, and generating the second processed signal by setting the second filter coefficients and executing the filtering process on the known signal when the filter input selection step outputs the imaginary part component; and a filter coefficient selection step for selecting ones of the updated first filter coefficients as the real part filter coefficients when the filter input selection step outputs the real part component and selecting ones of the updated second filter coefficients as the imaginary part filter coefficients when the filter input selection step outputs the imaginary part component.

* * * * *